Dec. 17, 1929. A. VAN DUYN 1,740,320
WEIGHING SCALE
Filed July 11, 1927 2 Sheets-Sheet 1

Dec. 17, 1929.   A. VAN DUYN   1,740,320
WEIGHING SCALE
Filed July 11, 1927   2 Sheets-Sheet 2
Fig. 2.
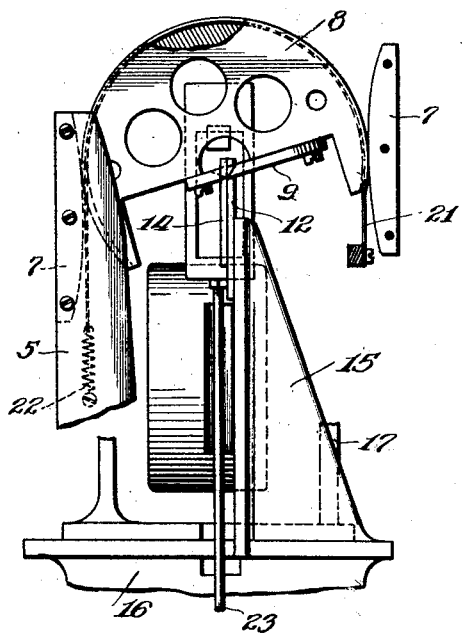
Fig. 3.
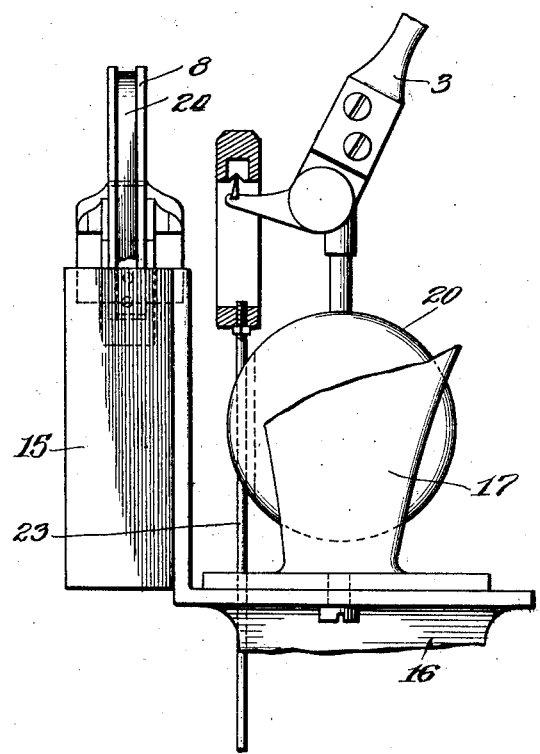
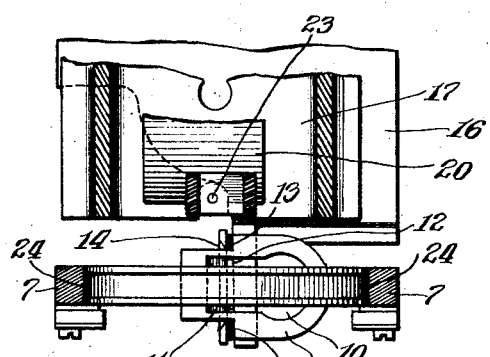
Fig. 4.
Fig. 6.
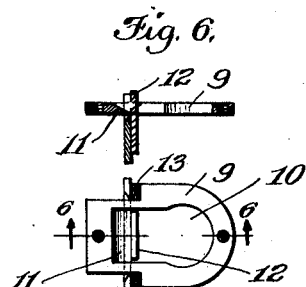
Fig. 5.
Adrianus van Duyn, Inventor
By Nissen & Crane
Attys.

Patented Dec. 17, 1929

1,740,320

UNITED STATES PATENT OFFICE

ADRIANUS VAN DUYN, OF ROTTERDAM, NETHERLANDS, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, THE NETHERLANDS, A LIMITED LIABILITY COMPANY OF THE NETHERLANDS

WEIGHING SCALE

Application filed July 11, 1927, Serial No. 204,746, and in Germany March 2, 1926.

This invention relates to a scale having one or more pans which are guided for parallel movement. In scales of this type the usual form of parallel guide does not present any serious difficulty in so-called front scales, that is, in scales in which the indicator casing stands on the base longitudinally of the same. In the so-called side scales, that is, in scales in which the indicator casing stands transversely of the base, a parallel guidance by means of the bars and rods leading to the indicator casing would, however, give rise to disturbing friction.

In order to overcome this difficulty it had been proposed to use a double bridge or beam system, which, however, renders weighing mechanism more complicated. In these devices the parallel guidance in the indicator casing may be dispensed with, but the casing for the weighing mechanism must be made very high, and this increases the manufacturing costs.

In order to avoid these difficulties and to attain simplification of the parallel guidance, even in the so-called side scales, the pan or pans are guided according to the present invention directly or indirectly along a rotatable member which is located between the pans in those scales in which more than one pan is used. The rotatable member may then be supported on knife edges.

One embodiment of the invention is illustrated in the drawings, in which:

Fig. 2 shows the device on a larger scale;

Fig. 3 is a side elevation;

Fig. 4 is a top plan view of Fig. 2;

Fig. 5 is a fragmentary view of the knife edge bearing for the rotatable guide; and Fig. 6 is a section on line 6—6 of Fig. 5.

Figure 1:
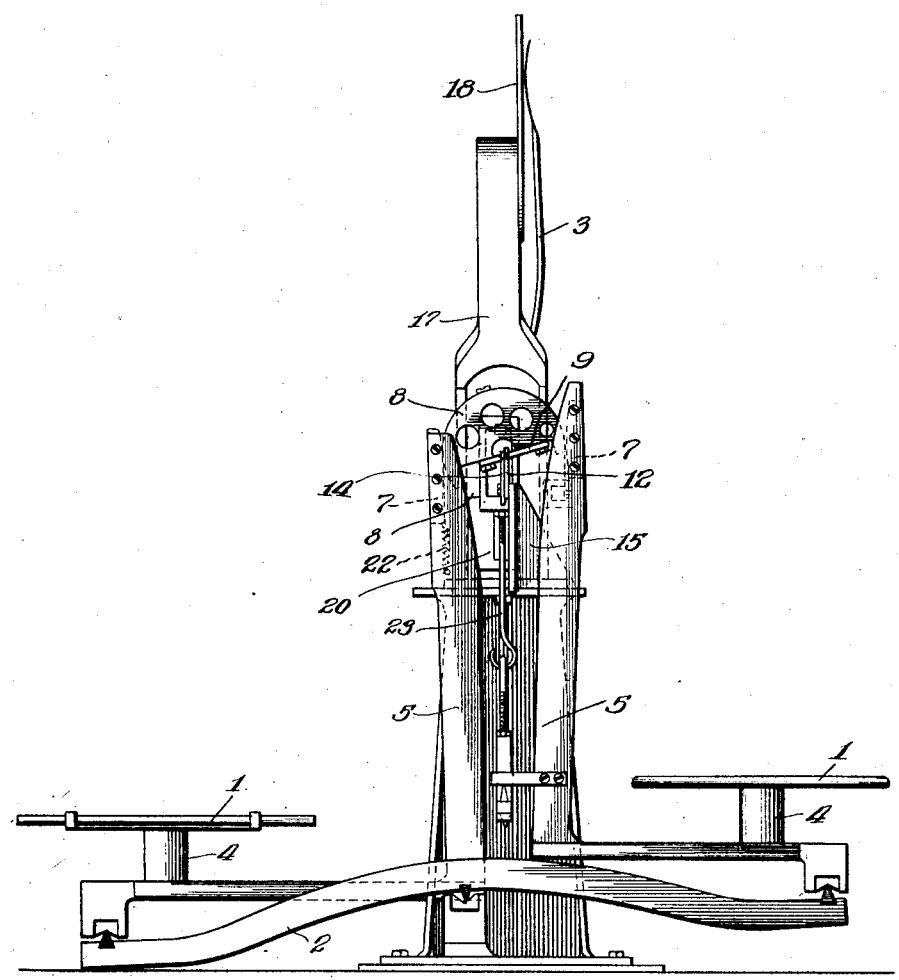
Fig. 1 is a front elevation of a scale with a device according to this invention.

The pans 1 of the scale illustrated in Fig. 1 are supported in the customary way on the bridge or beam 2. Each pan carrier 4 is connected with one end of a guide arm 5 which extends at first horizontally and then upwardly into the upper portion of the vertical scale tree or indicator casing.

The upper end of each arm 5 is provided with an adjustable part 7, Fig. 2, the inner edge of which is provided with an arcuate guideway, or some other suitable guide surface extending along a roller 8. The roller 8 is supported in knife edges secured to a plate 9 screwed to the same.

This plate 9 has a cut-out portion 10 which, as shown in Figs. 4, 5, and 6, is closed at the left-hand side by a beveled edge 11. The beveled edge 11 engages the vertical plate 12 which projects through the cut-out portion 10. Adjacent both ends of the beveled edge 11 the plate 9 is offset laterally and on these offset portions it is shaped to form the knife edges 13 extending in alinement with the edge 11 and engaging upwardly projecting ears on the plate 14, one at each side of the plate 9. This plate 14 is cut out on top to form the spaced ears and to admit the offset part of the plate 9, and it is secured by screws against the plate 12. Both plates are fixedly connected with the part 15 of the sub-frame of the scale. The upper edge of the cut-out portion of the plate 14 is beveled to form a knife edge contact with the plate 9.

Upon the sub-frame 16 of the scale the bracket 17 is rotatably mounted, said bracket supporting the indicator plate 18 and the pointer 3 with its pendulum weight 20.

The connecting rod for connecting the pendulum weight with the mechanism of the scale is indicated at 23.

The roller 8 may be maintained in its bearings by means of a flexible strap 21 placed about the same and the ends thereof are secured to the arms 5. In order to render this support a yielding one, one end of the strap may be secured to a spring 22, Fig. 2. The strap 21 is located in a groove 24, Fig. 3, so that the roller 8 and the parts 7 are in direct contact with each other during movement.

I claim:—

1. A rotating scale comprising a beam, pans pivotally mounted on said beam, uprights connected with said pans, and a rotatable element interposed between said uprights for guiding said pans for parallel movement.

2. A weighing scale comprising a scale beam, a pair of pans pivotally mounted on opposite ends of said scale beam, upright members connected with said pans, a rotatable element interposed between said upright members for guiding said pans for parallel movement, a pair of bearing plates having adjacent surfaces thereof disposed in a common plane, and knife edge bearings connected with said rotatable element and engaging said surfaces to hold said rotatable element against lateral movement in opposite directions.

3. A weighing scale comprising a scale beam, a pair of pans pivotally mounted on said scale beam adjacent opposite ends thereof, upright members connected with said pans, a rotatable element interposed between said upright members for guiding said pans for parallel movement, and a flexible member disposed about said rotatable element and connected to said uprights to hold said rotatable element from displacement.

4. A weighing scale comprising a scale beam, a pair of pans pivotally mounted on said scale beam at opposite ends thereof, a pair of upright members connected with said pans, a rotatable element interposed between said upright members for guiding said pans for parallel movement, a knife edge bearing for said rotatable element, a flexible member disposed about said rotatable member and connected with said upright members for retaining said rotatable element against displacement, and a spring tension device for said flexible member.

5. A weighing scale comprising a scale beam, a pair of pans mounted on said scale beam, upright members connected with said pans, a rotatable element interposed between said upright members for guiding said pans for parallel movement, said rotatable element having a peripheral groove therein, and a flexible member disposed in said groove and connected with said upright members for retaining said rotatable element against displacement.

6. A weighing scale comprising a scale beam, a pair of pans mounted on said scale beam, upright members connected with said pans, a rotatable element interposed between said upright members for guiding said pans for parallel movement, said rotatable element having a plate secured thereto provided with an opening, a bearing plate extending through said opening, said first-named plate having a beveled knife edge at one side of said opening for engaging said bearing plate, a second bearing plate having the surface thereof co-planar with said first-named bearing plate, and additional knife edge bearings on said first-named bearing plate engaging said coplanar surface of said second-named bearing plate.

7. In a weighing scale, a scale beam, a pair of pans pivotally mounted on said scale beam, arms extending inwardly from said plates, upright members secured to the inner ends of said arms, an indicator movable in a plane transverse to said inwardly extending arms, and a rotatable element interposed between said upright members and mounted to rotate about an axis transverse to said inwardly extending arms.

In testimony whereof I have signed my name to this specification on this 13th day of June A. D. 1927.

ADRIANUS van DUYN.